US012572396B2

(12) United States Patent
Odaira et al.

(10) Patent No.: US 12,572,396 B2
(45) Date of Patent: Mar. 10, 2026

(54) DETECTING IMPACT OF API USAGE IN MICROSERVICES

(71) Applicant: INTERNATIONAL BUSINESS MACHINES CORPORATION, Armonk, NY (US)

(72) Inventors: Rei Odaira, Austin, TX (US); Bedri Sendir, Austin, TX (US); Prawar Poudel, Morang (NP)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 17/986,292

(22) Filed: Nov. 14, 2022

(65) Prior Publication Data

US 2024/0160498 A1 May 16, 2024

(51) Int. Cl.
*G06F 3/00* (2006.01)
*G06F 9/54* (2006.01)
(52) U.S. Cl.
CPC ..................................... *G06F 9/54* (2013.01)
(58) Field of Classification Search
CPC ......................................................... G06F 9/54
See application file for complete search history.

(56) References Cited

U.S. PATENT DOCUMENTS 6,003,095 A * 12/1999 Pekowski ........... G06F 9/44521
717/163
9,027,000 B2 5/2015 Guerrera 9,313,215 B2 4/2016 Kalgi
10,182,129 B1 * 1/2019 Peterson ............. G06F 11/3006
11,256,598 B2 2/2022 Jha
11,277,320 B2 3/2022 Degioanni
11,303,546 B2 * 4/2022 Mogaki ................... G06F 9/505
2009/0235285 A1 * 9/2009 Kim ..................... G06F 16/9027
719/328
2009/0276763 A1 * 11/2009 Gulwani ............. G06F 9/44589
717/130

(Continued)

FOREIGN PATENT DOCUMENTS

CN 106027325 A 10/2016
CN 109756364 A 5/2019

OTHER PUBLICATIONS

Zhisong Fu, MapGraph: A High Level API for Fast Development of High Performance Graph Analytics on GPUs. (Year: 2014).*

(Continued)

*Primary Examiner* — Lechi Truong
(74) *Attorney, Agent, or Firm* — CHIP LAW GROUP

(57) ABSTRACT

A computer hardware system includes a static analyzer, a load estimator, and a hardware processor configured to perform the following executable operations. Using the static analyzer and for each egress API call site respectively associated with an ingress API handler of a microservice, a weight is generated and is included within a static analysis of the microservice also generated by the static analyzer. Using the load estimator and for each of the egress API call sites, a load is determined based upon the weight for the egress API call site, a number of times, over a predetermined period of time, a particular ingress API handler associated with the egress API call site is called, and a cost of a call to the egress API call site. Based upon the load, the microservice is modified.

18 Claims, 7 Drawing Sheets

200

(56)                   References Cited

U.S. PATENT DOCUMENTS

| | | | |
|---|---|---|---|
| 2010/0091018 A1* | 4/2010 | Tatarchuk | G06T 15/005 |
| | | | 345/473 |
| 2011/0307897 A1* | 12/2011 | Atterbury | G06F 9/4494 |
| | | | 718/102 |
| 2011/0321021 A1* | 12/2011 | Chen | G06F 9/323 |
| | | | 717/157 |
| 2016/0085527 A1* | 3/2016 | de Lima Ottoni | G06F 16/9024 |
| | | | 717/157 |
| 2016/0225042 A1 | 8/2016 | Tran | |
| 2016/0225043 A1* | 8/2016 | Tran | G06Q 30/0283 |
| 2016/0226736 A1* | 8/2016 | Tran | G06F 16/9024 |
| 2016/0323187 A1* | 11/2016 | Guzman | H04L 47/125 |
| 2017/0289307 A1* | 10/2017 | Thompson | G06F 9/505 |
| 2020/0167209 A1 | 5/2020 | Madhusudhan Nair | |
| 2021/0141708 A1* | 5/2021 | Mathur | G06F 11/323 |
| 2021/0342147 A1* | 11/2021 | Singh | G06F 9/451 |
| 2025/0004924 A1* | 1/2025 | Mishra | H04L 67/56 |

OTHER PUBLICATIONS

Michael Emmi, Rapid: Checking API Usage for the Cloud in the Cloud. (Year: 2021).*
Performance Analysis of Microservice Design Patterns.

\* cited by examiner

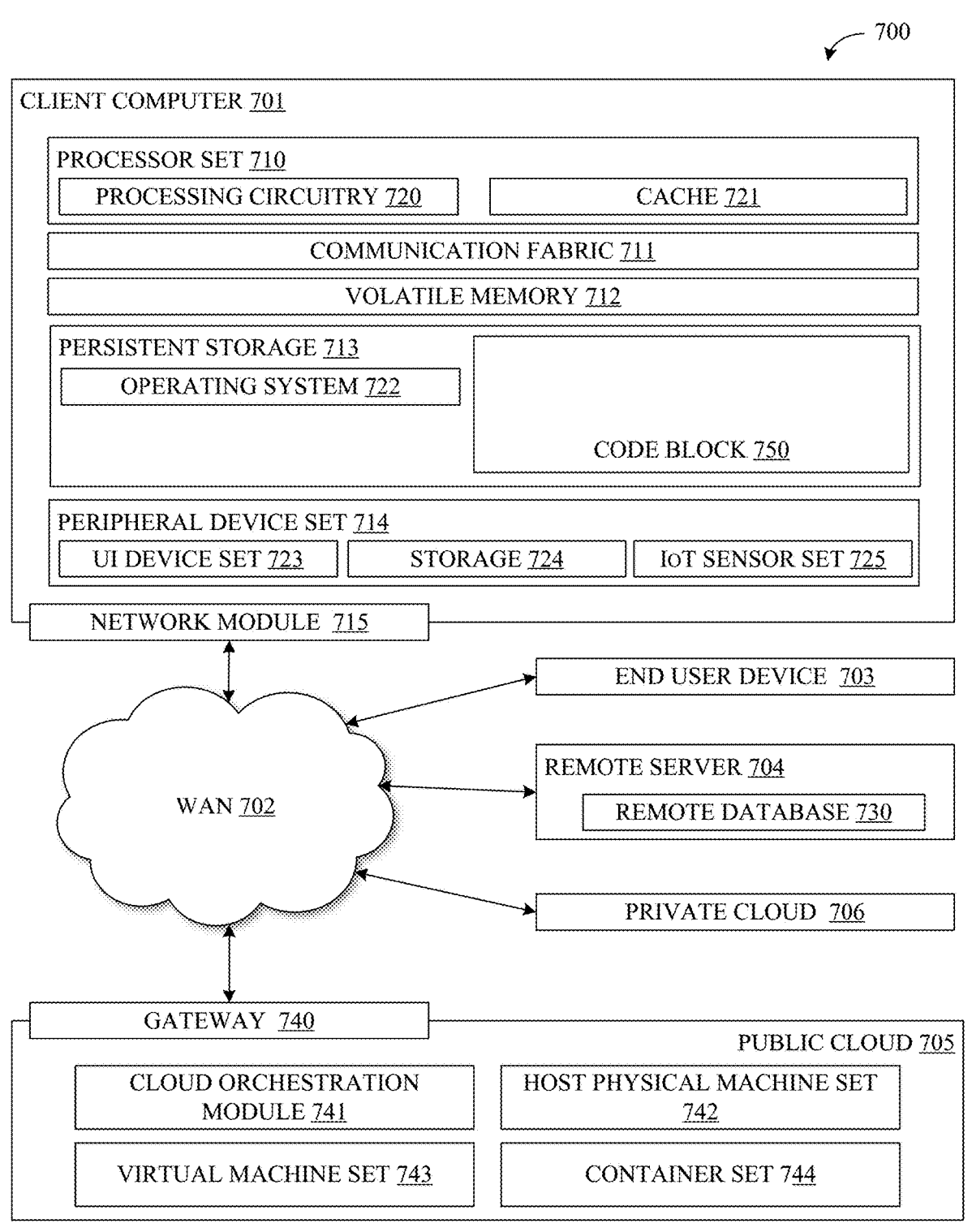

700

CLIENT COMPUTER 701

PROCESSOR SET 710

PROCESSING CIRCUITRY 720          CACHE 721

COMMUNICATION FABRIC 711

VOLATILE MEMORY 712

PERSISTENT STORAGE 713

OPERATING SYSTEM 722

CODE BLOCK 750

PERIPHERAL DEVICE SET 714

UI DEVICE SET 723          STORAGE 724          IoT SENSOR SET 725

NETWORK MODULE 715

WAN 702

END USER DEVICE 703

REMOTE SERVER 704

REMOTE DATABASE 730

PRIVATE CLOUD 706

GATEWAY 740

PUBLIC CLOUD 705

CLOUD ORCHESTRATION MODULE 741

HOST PHYSICAL MACHINE SET 742

VIRTUAL MACHINE SET 743

CONTAINER SET 744

FIG. 7

DETECTING IMPACT OF API USAGE IN MICROSERVICES

BACKGROUND

The present invention relates to computer-implemented microservices using APIs (Application Programming Interfaces), and more specifically, to detecting how usage of APIs impacts performance deploying microservices layer(s) and integration layer(s) using AR (Augmented Reality).

Software architecture is evolving into a microservice approach. Legacy approaches oftentimes involve a monolithic architecture using a large, tightly-coupled application. By comparison, microservices (also referred to as microservice architecture) are a cloud-native architectural approach in which a single application is composed of many loosely-coupled and independently-deployable smaller components or services (i.e., microservices) that are networked together (e.g., as nodes in a network).

Microservices typically have the following characteristics. They have their own technology stack, inclusive of the database and data management model. Additionally, microservices can communicate with one another over a combination of REST APIs, event streaming, and message brokers. Also, microservices can be organized by business capability with the line separating services often referred to as a bounded context.

There are a number of benefits of a microservice architecture over a monolithic architecture. These benefits include that the code can be updated more easily as new features or functionally can be added without modifying the entire application. Additionally, different stacks and different programming languages can be used for each of the different components. In other words, they can be independently deployable as well as independently modifiable. Still further, the different components can be scaled independently of one another, which reduces the waste and cost associated with having to scale entire applications because, for example, a single feature might be facing too much load. Loose coupling between microservices also builds a degree of fault isolation and better resilience into applications.

SUMMARY

A computer-implemented process using computer hardware system having a static analyzer a load estimator includes the following executable operations. Using the static analyzer and for each egress API call site respectively associated with an ingress API handler of a microservice, a weight is generated and is included within a static analysis of the microservice also generated by the static analyzer. Using the load estimator and for each of the egress API call sites, a load is determined based upon the weight for the egress API call site, a number of times, over a predetermined period of time, a particular ingress API handler associated with the egress API call site is called, and a cost of a call to the egress API call site. Based upon the load, the microservice is modified.

A computer hardware system includes a static analyzer, a load estimator, and a hardware processor configured to perform the following executable operations. Using the static analyzer and for each egress API call site respectively associated with an ingress API handler of a microservice, a weight is generated and is included within a static analysis of the microservice also generated by the static analyzer. Using the load estimator and for each of the egress API call sites, a load is determined based upon the weight for the egress API call site, a number of times, over a predetermined period of time, a particular ingress API handler associated with the egress API call site is called, and a cost of a call to the egress API call site. Based upon the load, the microservice is modified.

A computer program product includes computer readable storage medium having stored therein program code. The program code, which when executed by a computer hardware system including a static analyzer and a load estimator, cause the computer hardware system to perform the following operations. Using the static analyzer and for each egress API call site respectively associated with an ingress API handler of a microservice, a weight is generated and is included within a static analysis of the microservice also generated by the static analyzer. Using the load estimator and for each of the egress API call sites, a load is determined based upon the weight for the egress API call site, a number of times, over a predetermined period of time, a particular ingress API handler associated with the egress API call site is called, and a cost of a call to the egress API call site. Based upon the load, the microservice is modified.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 7 is a block diagram illustrating an example of computer environment for implementing portions of the methodology of FIG. 4 according to at least one embodiment of the present invention.

DETAILED DESCRIPTION

Figure 1:
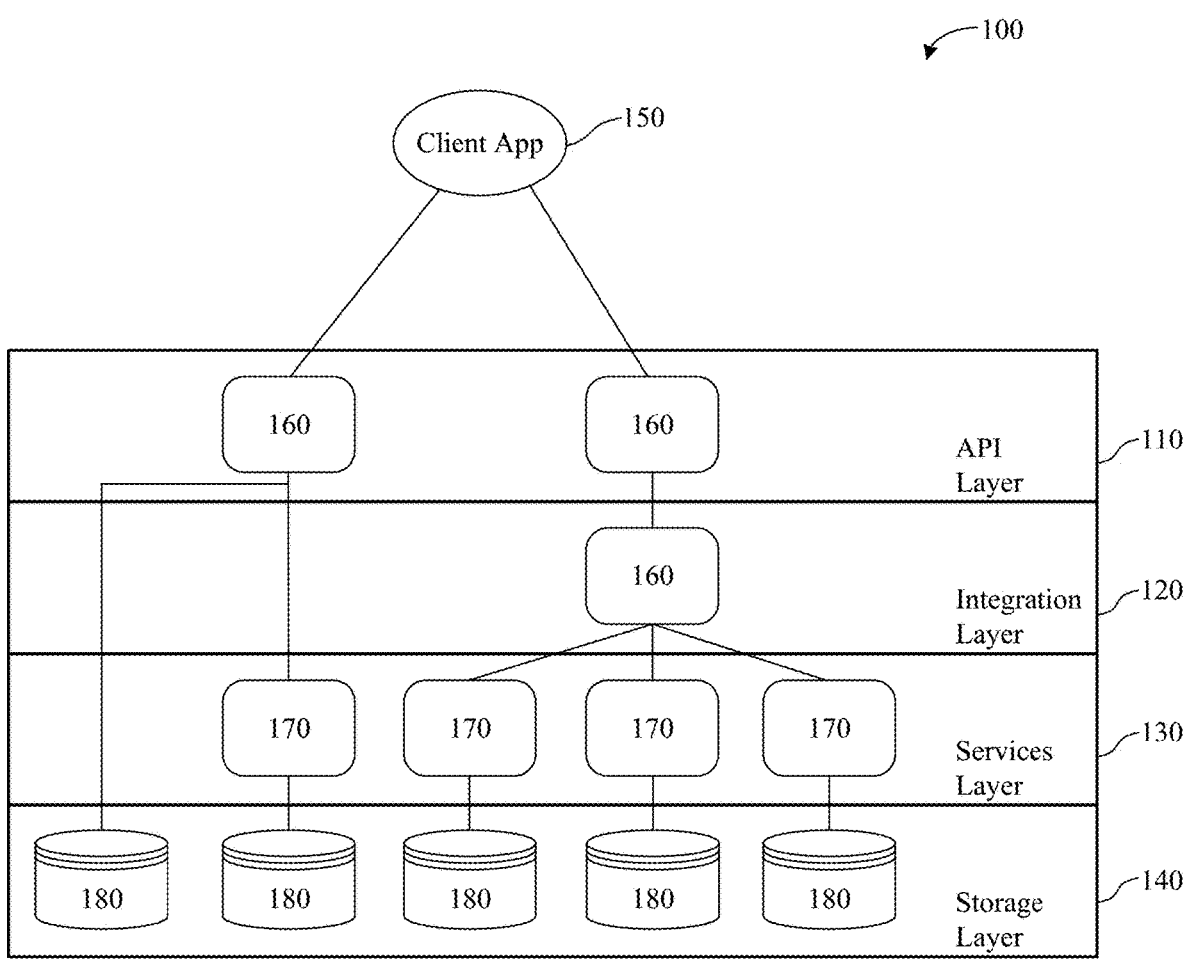
FIG. 1 is a block diagram illustrating a conventional microservice architecture.

FIG. 1 is an example description of a conventional microservice architecture 100. The microservice architecture 100 can comprise a number of layers including an API layer 110, an integration layer 120, a services layer 130, and a storage layer 140. A client application 150 typically interacts with the architecture 100 using APIs exposed by microservices 160 within the API layer 110. Working from the bottom-up, the storage (or data) layer 140 includes the data storage 180 for the architecture 100. The services layer includes the actual business logic and services 170 offered to the client application 150. This business logic and services can be in the form of traditional applications and/or microservices. In the context of a loan application, for example, individual business logic and services 170 may include a customer service, a credit service, and a loan service, and each of these services 170 may interact with data storage 180 contained within the storage layer 140. The integration layer 120 provides the capability required by different services and microservices within the architecture 100 to interact with one another. This capability can also be provided by microservices 160. As used herein, the API layer 110 refers to the particular API being exposed to the client application 150, and the particular API may be associated with one or more microservices 160. As also used herein, the integration layer 120 refers to the particular integration microservice that performs the integration function (i.e., facilitating communication between the various services, microservices, and applications within the architecture 100).

Figure 2:
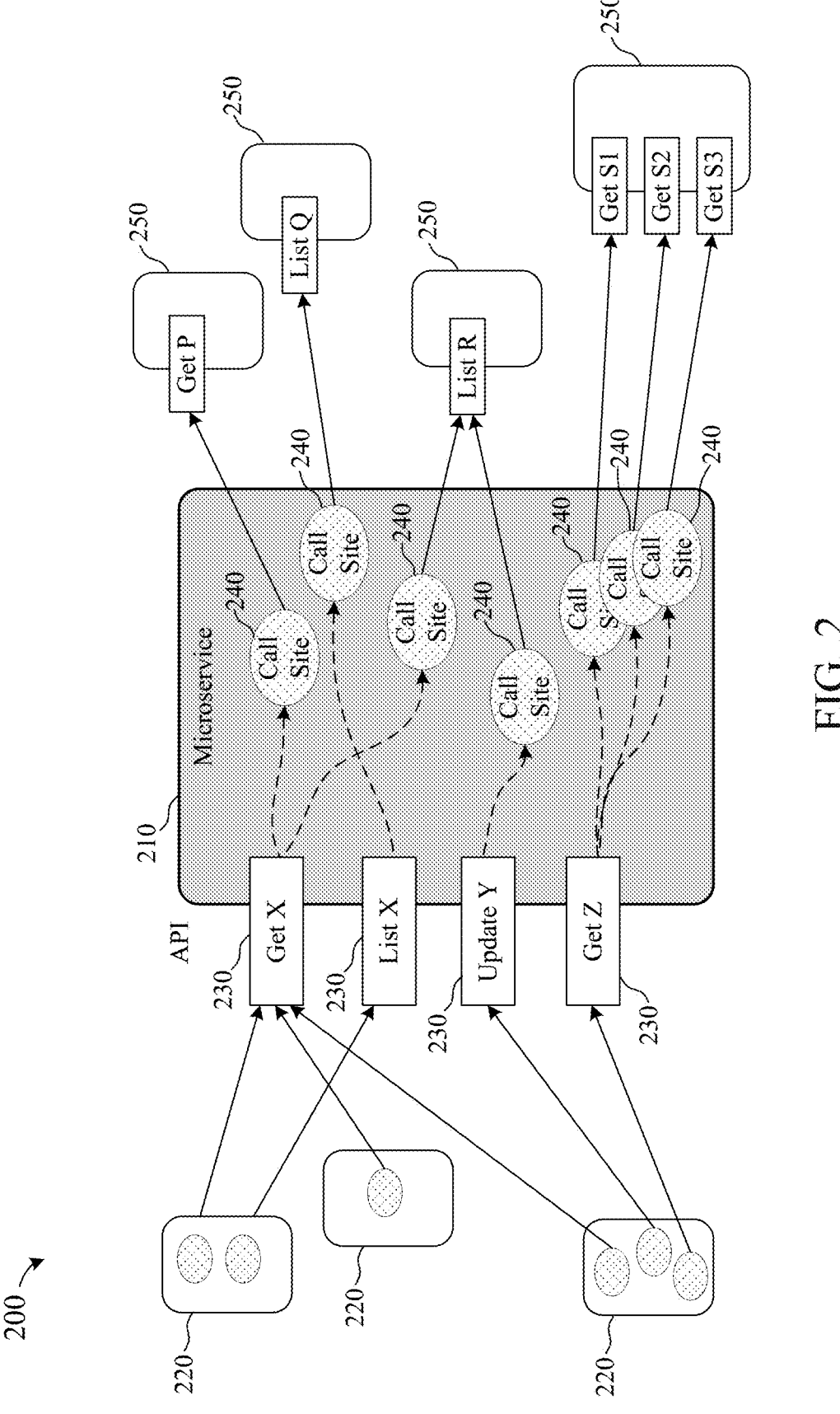
FIG. 2 is a block diagram illustrating aspects of a conventional architecture involving a microservice.

FIG. 2 illustrates aspects of a conventional architecture 200 involving a microservice 210. The microservice 210 exposes one or more ingress API handlers 230 through which other microservices/clients 220 interact. One or more egress API call sites 240 within the source code of the microservice 210 are associated with each of the ingress API handlers 230 and are configured to call functions/services located in other microservices 250. As used herein, the term "build" refers to a particular set of executable code associated with a particular build 370A-D of the microservice 210. Typically, different builds 370A-D of a particular microservice 210 are given different names.

Figure 3:
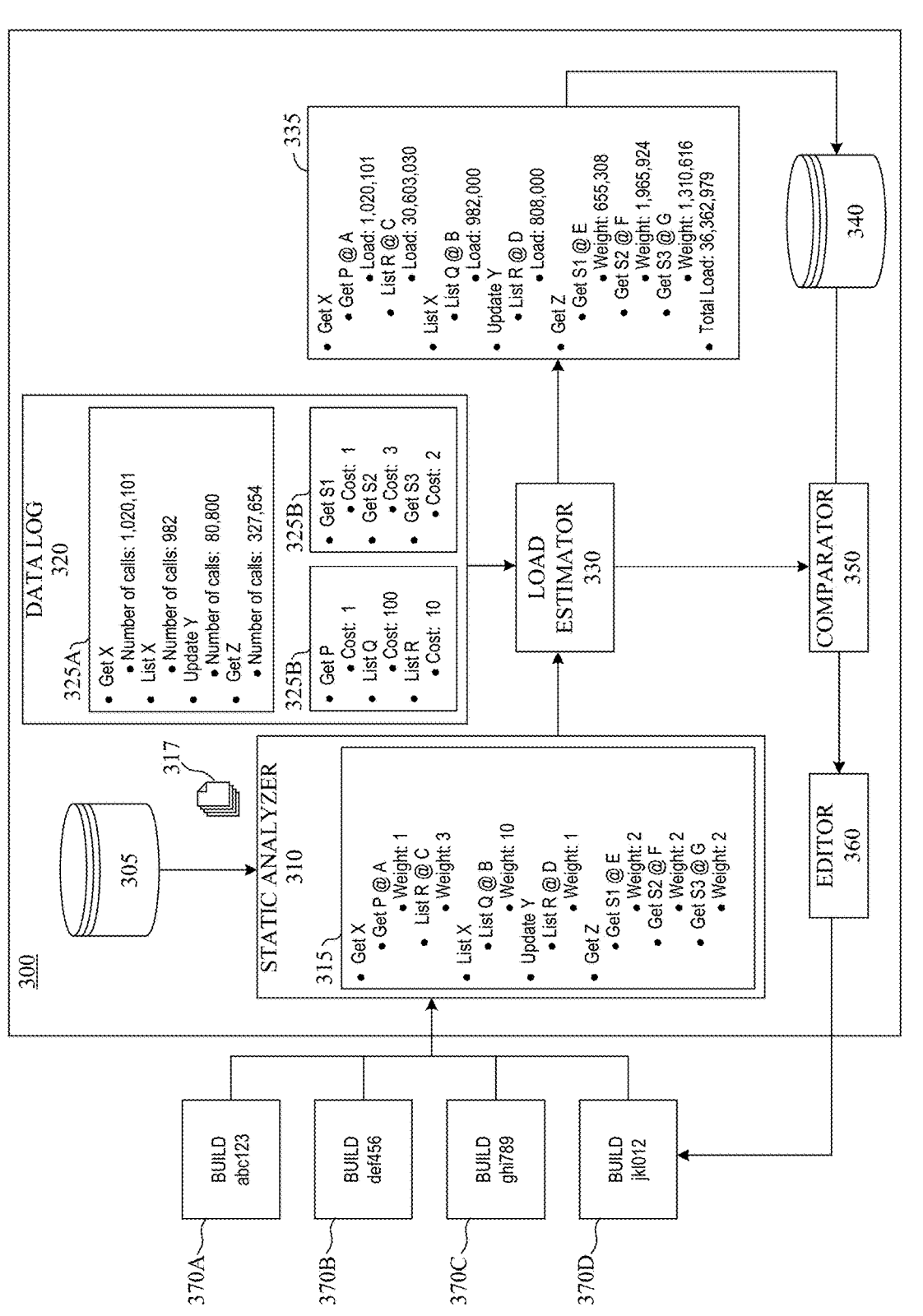
FIG. 3 is a block diagram illustrating an architecture of an example API performance detection system according to at least one embodiment of the present invention.
Figure 4:
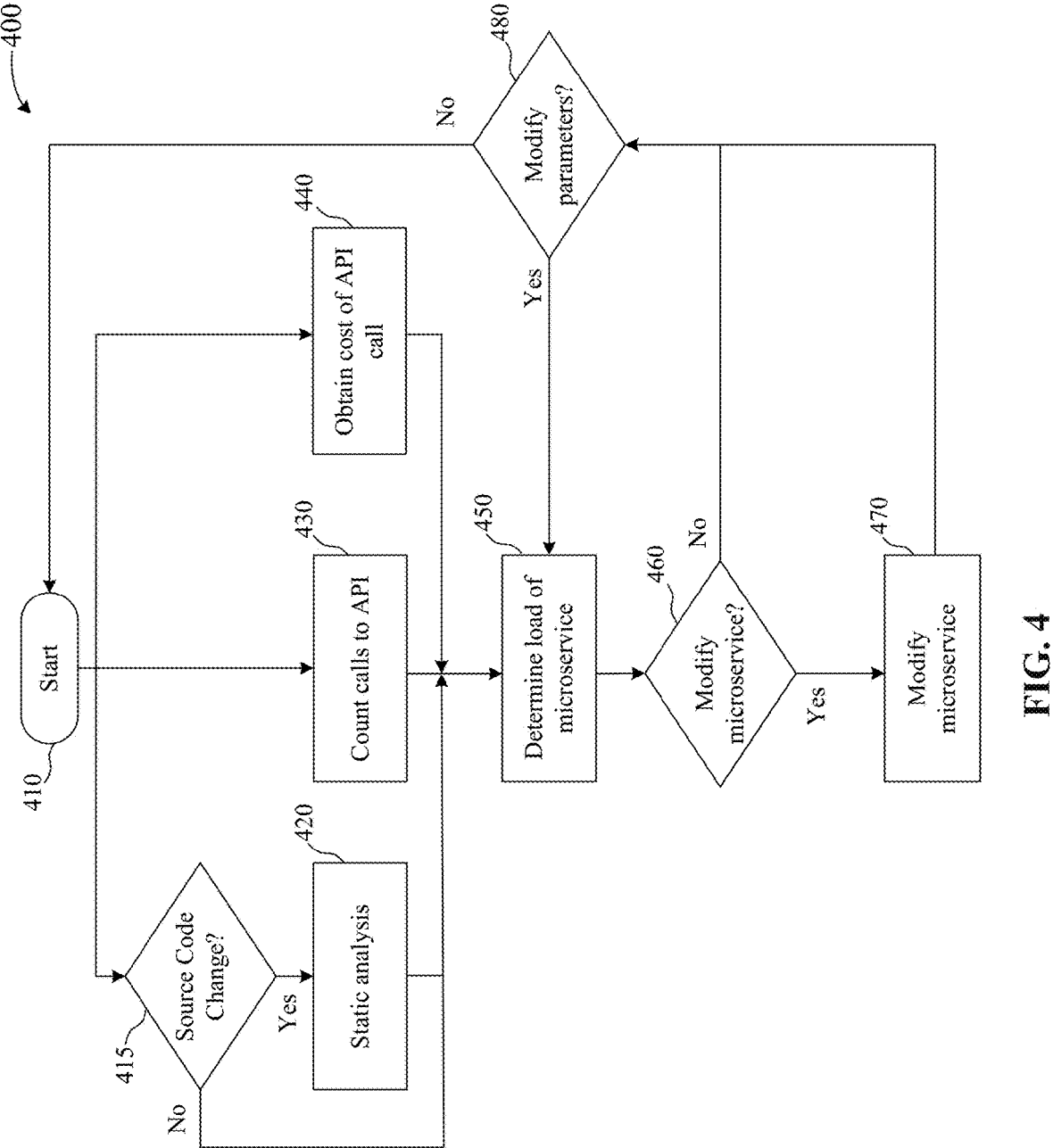
FIG. 4 illustrates an example method using the architecture of FIG. 3 according to at least one embodiment of the present invention.

Reference is made to FIG. 3 and FIG. 4, which respectively illustrate an API performance detection system 300 and methodology 400 for detecting impact of API usage in a microservice 210. Although not limited in this manner, the API performance detection system 300 includes one or more of storage 315, 340, a static analyzer 310, data log 320, load estimator 330, comparator 350, and editor 360. Although illustrated as being within a single system 300, the individual components can be distributed elsewhere. For example, the storage 315, 340 and data log 320 could be stored on different computers (not shown) and remotely accessed by the API performance detection system 300. Additionally, the editor 360 could be within a standalone computer system (not shown) and have access to the analysis generated by API performance detection system 300.

In 410, the process 400 begins, and as illustrated in FIG. 4, the operations of the process 400 can repeat and are capable of determining impact of API usage in a microservice and updating that determination over time. After 410, the process 400 branches to three different operations 420, 430, 440. Although illustrated as being performed in parallel, operations 420, 430, 440 can be performed in series or a combination of in parallel and in series.

In 420, a static analysis of the microservice is performed using the static analyzer 310. In certain aspects and with reference to 415, the static analysis is only to be performed initially or if there is a change in the source code of the microservice 210. The static analyzer 310 is configured to generate a static analysis 315 that generates a weight of each call site for an ingress API handler 230 exposed by the microservice 210. In certain aspects of the system 300, the static analyzer 310 determines that the weight for a particular egress call site 240 associated with an ingress API handler 230 represents how many times the egress call site 240 is executed, on average, for invocation of the ingress API handler 230.

Additionally, the static analyzer 310 may be configured to determine a variant of each egress call site 240 and annotate each egress call site 240 within the static analysis 315 with the variant. Examples of different variants of an egress call site 240 include a cross namespace call and a single namespace call, and the variant of the egress call site 240 may subsequently modify a weight associated with the egress call site 240. For example, if the microservice involved a shopping cart in an ecommerce system, a single namespace call may involve getting the contents of the shopping cart of a single user whereas a cross namespace call may involve getting the contents of the shopping carts for all users. In this instance, the cross namespace call may have a weighting factor several magnitudes greater than the single namespace call because of the different anticipated loads respectively associated with these different calls.

The static analyzer 310 is not limited in the manner by which the static analysis 315 is generated. However, in certain aspects, the static analyzer 310 utilizes a call graph 317 of the microservice 210 previously stored in data storage 315. A call graph 317 is a known type of computer data structure and represents the relationship between various subroutines/methods in a computer program (e.g., microservice 210). For example, method A may call methods B and C, which may in turn call other methods/processes/services. The static analyzer 310, in determining the weight, may also use a nesting level of the egress API call site 240 and the probability of conditional branches. For example, a single call to an ingress API handler 230 may result in the egress call site 240 being invoked multiple times, which would be reflected in the nesting level.

In 430, the number of calls to each ingress API handler 230 is counted and stored in one or more data logs 320. This data can also include when the call was made to the ingress API handler 230 so that the stored data can be subsequently analyzed for a particular time period.

In 440, a cost of each egress API call 240 is determined and stored in one or more data logs 320, which may be the same or different than the data logs 320 referred to in 430. Although not limited in this manner, the cost of each egress API call site 240 can include one more of: latency associated with the egress API call site 240, CPU utilization to associated with the egress API call site 240, and a number of objects in each resource associated with the egress AP call site 240.

In 450, a load 355 of the microservice is determined. Although not limited in this manner, in certain aspects the load 355 of the microservice is a computer data structure that includes load values, associated with each egress call site 240 and determined by multiplying the weight for the egress API call site 240, the cost of the call to the egress API call site 240, and the number of times the particular ingress API handler 230 associated with the egress API call site 240. The load 355 can then be stored in a storage device 340.

In 460, a determination is made, using the load information generated by the comparator 460, to either modify the microservice 210 or not modify the microservice 210. For example, if the load for a particular microservice 210 or group of microservices becomes too high (e.g., above a predetermined threshold), a determination may be made to edit a most recent build 370D of the microservice 210, which can be accomplished using editor 360 in 470. Using the comparator 350, for example, loads 355 from different builds 370A-D and/or different time periods can be compared and differences identified. For example the comparator 355 can determine that a particular change in the load 355 is based upon a different build 370A-D. Alternatively, the comparator can determine that a particular change in the load 355 is based upon a different time period.

Optionally, in 480, a determination can be made to modify certain of the parameters used to determine the load 355 of the microservice 210. For example, a user may be presented with a graphical user interface (not shown) that allows the user to modify the number of calls received for a particular ingress API call handler 230, which can allow a user to predict how the load 355 would change based upon different input conditions. Additionally, the graphical user interface may allow the user to select different time periods over which the load is determined. Otherwise, the methodology 400 repeats itself.

Figure 5:
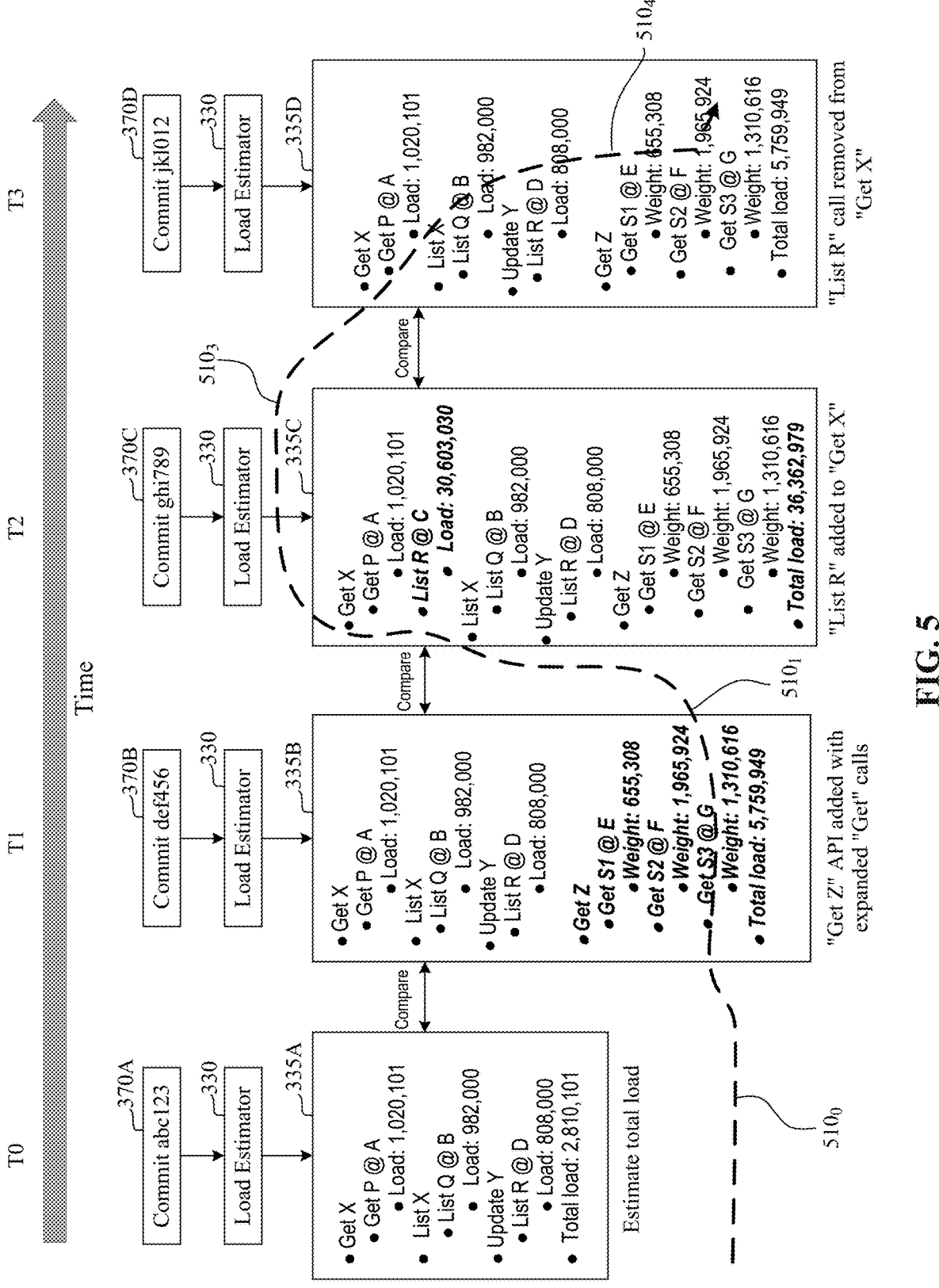
FIG. 5 is a block diagram illustrating how the estimated total usage of a microservice changes over a period of time.

FIG. 5 illustrates an example use of the API performance detection system 300 and methodology 400 accordingly to at least one embodiment of the present invention. At an initial time period T0, the load estimator 302 determines an estimated total load $510_0$ for an initial build abc123 370A of the microservice. At time period T1, the load estimator 302 determines a new estimated total load $510_1$ for the microservice after a "Get Z" egress API call is added to the microservice with expanded "Get" calls thereby creating build def456 370B. As illustrated, this change resulting in build def456 370B causes a slight increase in the estimated total load $510_1$. However, at time period T2, after a "List R" egress API call is added to the "Get X" ingress AP call of the microservice 210, the load estimator 302 determines a new estimated total load $510_2$ for build ghi789 370C, which is significantly higher than the total load $510_1$ estimated at T1 for build def456 370B. In response to the increased total load $510_2$, a determination is made to remove the "List R" egress API call from the "Get X" ingress API call at time period T3, which results in a new build jkl012 370D of the microservice 210. The load estimator 302 then estimates that the total load 5103 for the new build jkl0123 370D of the microservice 210 to be significantly reduced.

Figure 6:
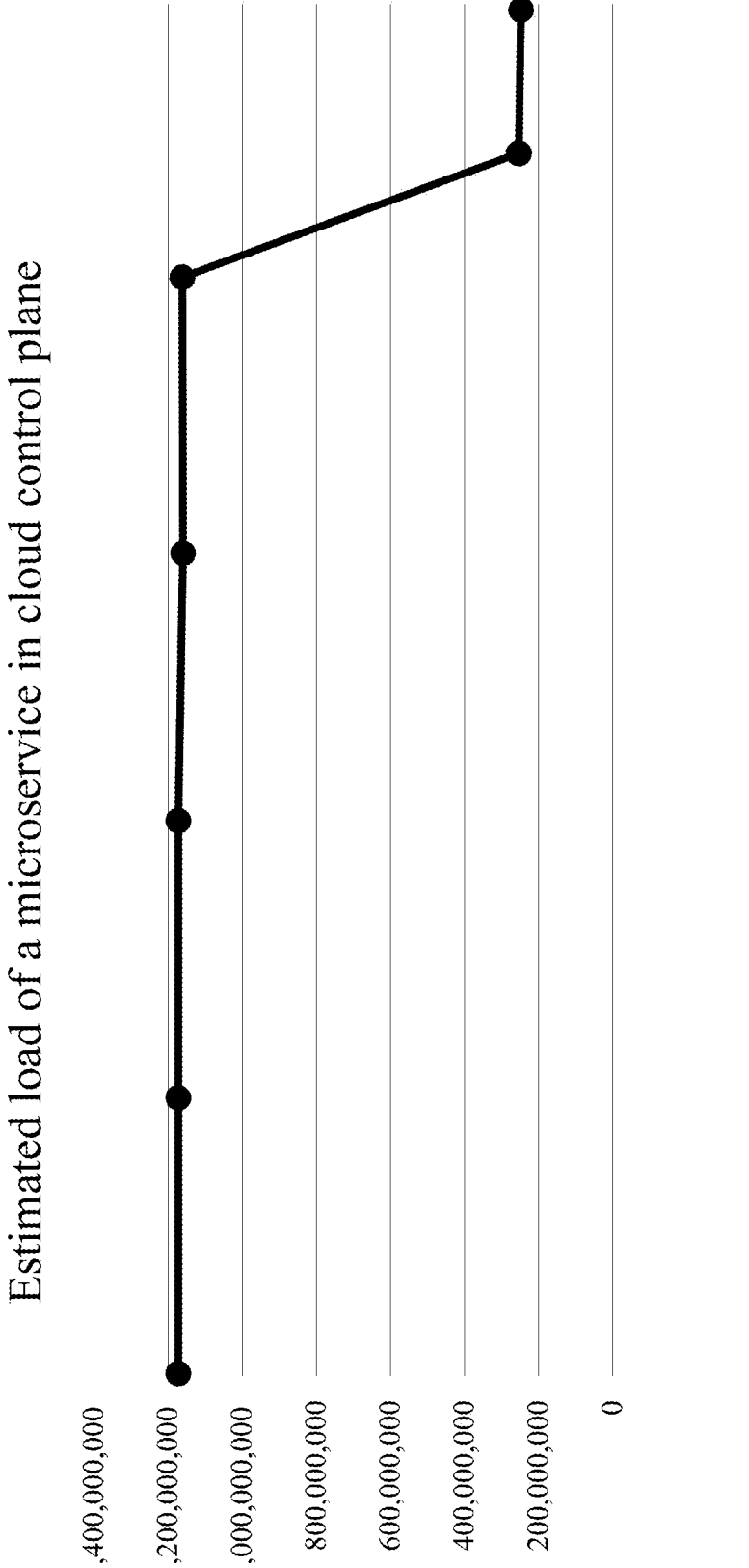
FIG. 6 is a chart illustrating how the estimated total usage of a microservice changes over a period of time.

FIG. 6 illustrates an example in which the methodology 400 was experimentally used to track the load of a microservice in a cloud control plane. As illustrated, the methodology was able to identify how the load changed upon the removal of a heavyweight ingress API handler.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Referring to FIG. 7, computing environment 700 contains an example of an environment for the execution of at least some of the computer code involved in performing the inventive methods, such as API performance detection code block 750 for implementing the operations of the API performance detection system 300. Computing environment 700 includes, for example, computer 701, wide area network (WAN) 702, end user device (EUD) 703, remote server 704, public cloud 705, and private cloud 706. In certain aspects, computer 701 includes processor set 710 (including processing circuitry 720 and cache 721), communication fabric 711, volatile memory 712, persistent storage 713 (including operating system 722 and API performance detection code block 750), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. However, to simplify this presentation of computing environment 700, detailed discussion is focused on a single computer, specifically computer 701. Computer 701 may or may not be located in a cloud, even though it is not shown in a cloud in FIG. 7 except to any extent as may be affirmatively indicated.

Processor set 710 includes one, or more, computer processors of any type now known or to be developed in the future. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In certain computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in API performance detection code block 750 in persistent storage 713.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 711 is the signal conduction paths that allow the various components of computer 701 to communicate with each other. Typically, this communication fabric 711 is made of switches and electrically conductive paths, such as the switches and electrically conductive paths that make up busses, bridges, physical input/output ports and the like. Other types of signal communication paths may be used for the communication fabric 711, such as fiber optic communication paths and/or wireless communication paths.

Volatile memory 712 is any type of volatile memory now known or to be developed in the future. Examples include dynamic type random access memory (RAM) or static type RAM. Typically, the volatile memory 712 is characterized by random access, but this is not required unless affirmatively indicated. In computer 701, the volatile memory 712 is located in a single package and is internal to computer 701. In addition to alternatively, the volatile memory 712 may be distributed over multiple packages and/or located externally with respect to computer 701.

Persistent storage 713 is any form of non-volatile storage for computers that is now known or to be developed in the future. The non-volatility of the persistent storage 713 means that the stored data is maintained regardless of whether power is being supplied to computer 701 and/or directly to persistent storage 713. Persistent storage 713 may be a read only memory (ROM), but typically at least a portion of the persistent storage 713 allows writing of data, deletion of data and re-writing of data. Some familiar forms of persistent storage 713 include magnetic disks and solid state storage devices. Operating system 722 may take several forms, such as various known proprietary operating systems or open source Portable Operating System Interface type operating systems that employ a kernel. The code included in API performance detection code block 750 typically includes at least some of the computer code involved in performing the inventive methods.

Peripheral device set 714 includes the set of peripheral devices for computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some aspects, storage 724 may take the form of a quantum computing storage device for storing data in the form of qubits. In aspects where computer 701 is required to have a large amount of storage (for example, where computer 701 locally stores and manages a large database) then this storage 724 may be provided by peripheral storage devices designed for storing very large amounts of data, such as a storage area network (SAN) that is shared by multiple, geographically distributed computers. Internet-of-Things (IoT) sensor set 725 is made up of sensors that can be used in IoT applications. For example, one sensor may be a thermometer and another sensor may be a motion detector.

Network module 715 is the collection of computer software, hardware, and firmware that allows computer 701 to communicate with other computers through a Wide Area Network (WAN) 702. Network module 715 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 715 are performed on the same physical hardware device. In other aspects (for example, aspects that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any Wide Area Network (for example, the internet) capable of communicating computer data over non-local distances by any technology for communicating computer data, now known or to be developed in the future. In some aspects, the WAN 702 ay be replaced and/or supplemented by local area networks (LANs) designed to communicate data between devices located in a local area, such as a Wi-Fi network. The WAN 702 and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In certain aspects, EUD 703 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704. As defined herein, the term "server" means a data processing system configured to share services with one or more other data processing systems.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other aspects, a private cloud 706 may be disconnected from the internet entirely (e.g., WAN 702) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 705 and private cloud 706 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method within a computer hardware system including a static analyzer and a load estimator, the computer-implemented method comprising:
    generating, using the static analyzer and for each egress API call site of egress API call sites respectively associated with a particular ingress API handler of a microservice, a weight included within a static analysis of the microservice, wherein the static analysis of the microservice is generated by the static analyzer, and
    the microservice corresponds to a cloud-native architectural approach;
    determining, using the load estimator and for each egress API call site of the egress API call sites, a load based upon:
    the weight for a respective egress API call site of the egress API call sites,
    a number of times, over a predetermined period of time, the particular ingress API handler associated with the respective egress API call site is called, and
    a cost of a call to the respective egress API call site, wherein the cost includes latency associated with the egress API call site and CPU utilization associated with the egress API call site;
    determining, that a total load of the microservice is above a threshold, wherein the total load of the microservice is determined based on the determined load of each egress API call site of the egress API call sites; and
    modifying the microservice based upon the determination that the total load is above the threshold.

2. The computer-implemented method of claim 1, further comprising:
    determining, by the static analyzer, the weight using a call graph of the microservice.

3. The computer-implemented method of claim 1, wherein
    the weight represents an average number of times the respective egress API call site of the egress API call sites is executed based on a single invocation of the particular ingress API handler associated with the respective egress API call site.

4. The computer-implemented method of claim 1, further comprising:
    determining, by the load estimator, the load of a each egress API call site of the egress API call sites based upon multiplying the weight for the respective egress API call site, the cost of the call to the respective egress API call site, and the number of times the particular ingress API handler is called.

5. The computer-implemented method of claim 1, further comprising
    detecting a change in the microservice based upon a comparison of the total load of the microservice with a previously-calculated total load of the microservice having a different build.

6. The computer-implemented method of claim 5, further comprising
    inferring a change in the total load of the microservice relative to a change in the load of the respective egress API call site by altering the number of times the particular ingress API handler associated with the respective egress API call site is called.

7. The computer-implemented method of claim 5, further comprising
    inferring a change in the total load of the microservice relative to a change in the load of each egress API call site of the egress API call sites by altering the cost of at least one egress API call site of the egress API call sites.

8. A computer hardware system including a static analyzer and a load estimator, the computer hardware system comprising:
    a hardware processor configured to perform the following executable operations:

generating, using the static analyzer and for each egress API call site of egress API call sites respectively associated with a particular ingress API handler of a microservice, a weight included within a static analysis of the microservice, wherein the static analysis of the microservice is generated by the static analyzer, and the microservice corresponds to a cloud-native architectural approach;

determining, using the load estimator and for each egress API call site of the egress API call sites, a load based upon:

the weight for a respective egress API call site of the egress API call sites, a number of times, over a predetermined period of time, the particular ingress API handler associated with the respective egress API call site is called, and a cost of a call to the respective egress API call site, wherein the cost includes latency associated with the egress API call site and CPU utilization associated with the egress API call site;

determining, that a total load of the microservice is above a threshold, wherein the total load of the microservice is determined based on the determined load of each egress API call site of the egress API call sites; and modifying the microservice based upon the determination that the total load is above the threshold.

9. The computer hardware system of claim 8, wherein the executable operations further comprising:

determining, by the static analyzer, the weight using a call graph of the microservice.

10. The computer hardware system of claim 8, wherein the weight represents an average number of times the respective egress API call site of the egress API call sites is executed based on a single invocation of the particular ingress API handler associated with the respective egress API call site.

11. The computer hardware system of claim 8, wherein the executable operations further comprising:

determining, by the load estimator, the load of each egress API call site of the egress API call sites based upon multiplying the weight for the respective egress API call site, the cost of the call to the respective egress API call site, and the number of times the particular ingress API handler is called.

12. The computer hardware system of claim 8, wherein the executable operations further comprising:

detecting a change in the microservice based upon a comparison of the total load of the microservice with a previously-calculated total load of the microservice having a different build.

13. The computer hardware system of claim 12, the executable operations further comprising:

inferring a change in the total load of the microservice relative to a change in the load of the respective egress API call site by altering the number of times the particular ingress API handler associated with the respective egress API call site is called.

14. The computer hardware system of claim 12, the executable operations further comprising inferring a change in the total load of the microservice relative to a change in the load of each of the egress API call site of the egress API call sites by altering the cost of at least one egress API call site of the egress API call sites.

15. A computer program product, comprising:

a computer readable storage medium having stored therein program code, the program code, which when executed by a computer hardware system including a static analyzer and a load estimator, cause the computer hardware system to perform:

generating, using the static analyzer and for each egress API call site of egress API call sites respectively associated with a particular ingress API handler of a microservice, a weight included within a static analysis of the microservice, wherein the static analysis of the microservice is generated by the static analyzer, and the microservice corresponds to a cloud native architectural approach;

determining, using the load estimator and for each egress API call of the egress API call sites, a load based upon:

the weight for a respective egress API call site of the egress API call sites, a number of times, over a predetermined period of time, the particular ingress API handler associated with the respective egress API call site is called, and a cost of a call to the respective egress API call site, wherein the cost includes latency associated with the egress API call site and CPU utilization associated with the egress API call site determining that a total load of the microservice is above a threshold, wherein the total load of the microservice is determined based on the determined load of each egress API call site of the egress API call sites; and modifying the microservice based upon the determination that the total load is above the threshold.

16. The computer program product of claim 15, wherein the program code further cause the computer hardware system to perform:

determining, by the static analyzer, the weight using a call graph of the microservice, and wherein the weight represents an average number of times the respective egress API call site of the egress API call sites is executed based on a single invocation of the particular ingress API handler associated with the respective egress API call site.

17. The computer program product of claim 15, wherein the program code further cause the computer hardware system to perform:

determining, by the load estimator, the load of each egress API call site of the egress API call sites based upon multiplying the weight for the respective egress API call site, the cost of the call to the respective egress API call site, and the number of times the particular ingress API handler is called.

18. The computer program product of claim 15, wherein the program code further cause the computer hardware system to perform:

detecting a change in the microservice based upon a comparison of the total load of the microservice with a previously-calculated total load of the microservice having a different build.

* * * * *